United States Patent
Aliakseyeu et al.

(10) Patent No.: US 11,269,041 B2
(45) Date of Patent: Mar. 8, 2022

(54) SYSTEM FOR COMMUNICATING A PRESENCE OF A DEVICE VIA A LIGHT SOURCE

(71) Applicant: SIGNIFY HOLDING B.V., Eindhoven (NL)

(72) Inventors: Dzmitry Viktorovich Aliakseyeu, Eindhoven (NL); Mustafa Tolga Eren, Eindhoven (NL); Bartel Marinus Van De Sluis, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 223 days.

(21) Appl. No.: 16/634,271

(22) PCT Filed: Jul. 17, 2018

(86) PCT No.: PCT/EP2018/069353
§ 371 (c)(1),
(2) Date: Jan. 27, 2020

(87) PCT Pub. No.: WO2019/020430
PCT Pub. Date: Jan. 31, 2019

(65) Prior Publication Data
US 2021/0088618 A1 Mar. 25, 2021

(30) Foreign Application Priority Data
Jul. 26, 2017 (EP) .................................... 17183277

(51) Int. Cl.
*G01S 1/70* (2006.01)
*G01S 5/00* (2006.01)
*G01S 5/16* (2006.01)
*H04B 10/116* (2013.01)

(52) U.S. Cl.
CPC .......... *G01S 1/7032* (2019.08); *G01S 1/7034* (2019.08); *G01S 5/0036* (2013.01); *G01S 5/16* (2013.01); *H04B 10/116* (2013.01); *G01S 2201/01* (2019.08)

(58) Field of Classification Search
CPC ........ G01S 1/7032; G01S 1/7034; G01S 5/16; G01S 2201/01; H04B 10/116
USPC ......................................................... 398/118
See application file for complete search history.

(56) References Cited

U.S. PATENT DOCUMENTS

| 6,795,041 B2 | 9/2004 | Ogawa et al. |
| 8,830,267 B2 | 9/2014 | Brackney |
| 9,041,731 B2 | 5/2015 | Aliakseyeu et al. |
| 9,085,927 B2 | 7/2015 | Oshima et al. |

(Continued)

FOREIGN PATENT DOCUMENTS

EP 1732247 A1 12/2006

*Primary Examiner* — Dalzid E Singh

(57) ABSTRACT

A system (100) for communicating a presence of a device via a light source (110) configured to emit light comprising an embedded code is disclosed. The system (100) comprises: a controller (102) comprising: a receiver (106) configured to receive a response signal from a first device (120), which response signal comprises an identifier of the first device (120), and which response signal is indicative of that the embedded code has been detected by the first device (120), and a processor (104) configured to correlate the embedded code with the identifier of the first device (120), such that the embedded code is representative of the identifier of the first device (120).

12 Claims, 4 Drawing Sheets

(56) References Cited

U.S. PATENT DOCUMENTS

| | | | |
|---|---|---|---|
| 9,483,875 B2 | 11/2016 | Theimer et al. | |
| 9,600,983 B1* | 3/2017 | Lydecker | H05B 47/19 |
| 2009/0310971 A1* | 12/2009 | Kim | H04B 10/116 |
| | | | 398/103 |
| 2013/0026224 A1* | 1/2013 | Gan | G01C 21/206 |
| | | | 235/375 |
| 2013/0026940 A1* | 1/2013 | Ganick | H04N 5/2357 |
| | | | 315/224 |
| 2015/0002292 A1 | 1/2015 | Cavalcanti et al. | |
| 2015/0003832 A1 | 1/2015 | Yamasaki et al. | |
| 2015/0147067 A1* | 5/2015 | Ryan | H04W 4/02 |
| | | | 398/118 |
| 2015/0372753 A1* | 12/2015 | Jovicic | H04B 10/116 |
| | | | 398/172 |
| 2016/0028477 A1* | 1/2016 | Jovicic | H04B 10/116 |
| | | | 398/118 |
| 2016/0227634 A1 | 8/2016 | Engelen et al. | |

* cited by examiner

SYSTEM FOR COMMUNICATING A PRESENCE OF A DEVICE VIA A LIGHT SOURCE

CROSS-REFERENCE TO PRIOR APPLICATIONS

This application is the U.S. National Phase application under 35 U.S.C. § 371 of International Application No. PCT/EP2018/069353, filed on Jul. 17, 2018, which claims the benefit of European Patent Application No. 17183277.7, filed on Jul. 26, 2017. These applications are hereby incorporated by reference herein.

FIELD OF THE INVENTION

The invention relates to a system for communicating a presence of a device via a light source. The invention further relates to a method of communicating a presence of a device via a light source, and to a computer program product for executing the method.

BACKGROUND

Visible Light Communication (VLC) systems enable communication from light sources to devices. These devices comprise a light detector, such as a camera or a photodiode, for detecting light comprising an embedded code emitted by a light source. The embedded code may be representative of location information, enabling the device to determine its position based on the location information. In other (indoor) positioning systems, a device may determine its position relative to a plurality of radio frequency (RF) beacons.

The position of a first device may be communicated to a (central) server, which may use the position information of the first device for other purposes, such as communicating the position of the first device to a second device. The second device may render a map of the environment on a display, and render an icon of the first device on the map to indicate the position of the first device. A user of the second device may then use the map to navigate to the user of the first device.

SUMMARY OF THE INVENTION

It is an object of the present invention to improve the process of finding a person, object or a device in a space.

According to a first aspect of the present invention, the object is achieved by a system for communicating a presence of a device via a light source configured to emit light comprising an embedded code, the system comprising: a controller comprising:

a receiver configured to receive a response signal from a first device, which response signal comprises an identifier of the first device, and which response signal is indicative of that the embedded code has been detected by the first device, and a processor configured to correlate the embedded code with the identifier of the first device by associating the identifier of the first device with the embedded code, such that the embedded code is representative of the identifier of the first device wherein the system further comprises a second device comprising:

a second light detector configured to detect light emitted by the light source, a second processor configured to retrieve the embedded code from the light, to retrieve the identifier of the first device correlated with the embedded code, and to identify the first device based thereon.

By correlating the coded light emitted by the light source with the identifier of the first device that is receiving the embedded code, the controller enables a second device, such as a smartphone, to detect which (first) device is located at the light source. This is beneficial, because it enables a user of the second device to locate the first device (or its user), simply by scanning light sources in an environment by pointing the light detector of the second device towards light sources in the environment. Upon detecting a code correlated/associated with the first device (and, optionally, its user), the second device may provide an indicator to the user of the second device that (the user of) the first device is located at the light source. Thus, the controller of the system enables finding a person or a device in a space.

Another benefit of the system is that the light source may be used for two purposes. A first purpose may, for example, be to determine the position of the first device, which may for example grant the first device access to certain resources (e.g. access to a local network, access to lighting/heating/blinds control at the position of the first device). A second purpose of the light source is to inform the second device about the position of the first device.

The processor may be configured to correlate the embedded code with the identifier of the first device by embedding the identifier of the first device in the embedded code. This enables a second device to detect the presence of the first device (and, optionally, its user) by retrieving the identifier of the first device from the embedded code.

The processor may be configured to correlate the embedded code with the identifier of the first device by storing an association between the identifier of the first device and the embedded code in a memory. The embedded code may, for example, comprise a link to the association/correlation in the memory. This enables a second device to detect the presence of the first device (and, optionally, its user) by retrieving the identifier of the first device from the memory upon detecting the embedded code.

The system may further comprise the first device comprising:

a first light detector configured to detect the light emitted by the light source, a first processor configured to retrieve the embedded code from the light, to identify the light source based on the embedded code, and to generate the response signal, and a transmitter configured to transmit the response signal to the controller.

The system further comprises the second device comprising:

a second light detector configured to detect light emitted by the light source, a second processor configured to retrieve the embedded code from the light, to retrieve the identifier of the first device correlated with the embedded code, and to identify the first device based thereon.

The second device may further comprise a user interface, and the second processor may be further configured to render information of the identified first device on the user interface. This provides the advantage that the user can identify the first device (and, optionally, its user) via the user interface.

The user interface may comprise an image rendering device, and the second device may further comprise an image capture device configured to capture an image comprising the light source. The second processor may be further configured to determine a first position of the light source in the image, and to use the first position as an anchor for rendering the information of the first device on the image rendering device. The information may be rendered as an overlay on the captured image. Alternatively, the image rendering device may be a projector configured to project the information of the first device, for example on smartglasses, or directly on the retina of the user, as an overlay on a (view on a) physical environment wherein the second device is located. By determining the position of the light source in the image, and by rendering the information of the first device at a location on the image rendering device relative to the light source, it is clear to a user of the second device at (or underneath) which light source the first device (and, optionally, its user) is located.

The user interface may comprise an image rendering device, and the second device may further comprise an image capture device configured to capture an image comprising the first device and/or an entity associated with the first device. The second processor is further configured to determine a first position of the first device and/or the entity in the image, and use the first position as an anchor for rendering the information of the first device on the image rendering device. By determining the position of the first device in the image, or by determining the position of the entity (e.g. a user) associated with the first device, and by rendering the information about the first device at a location on the image rendering device relative to the first device or the entity, it is clear to a user of the second device where the first device and/or its user is located.

The second processor may be further configured to determine a second position of a second light source or an object in the image, and to use the second position as a second anchor for rendering the information of the first device on the image rendering device. It is beneficial to determine positions of additional objects for positioning the information, because this enables more precise positioning of the information. Using multiple light sources, entities and/or objects to position the information enables correct positioning in a 3D environment from different points of view.

The identifier may be representative of a user identifier of a user operating the first device, and the second processor may be configured to identify the user operating the first device based on the user identifier. This enables the second device to identify the user operating the first device, which is beneficial because it enables distinguishing between multiple users.

The identifier may be further representative of a state of the first device or its user, and the second processor may be further configured to determine the state of the first device based on the identifier. This enables the second device to determine the state of the first device (e.g. on, off, do not disturb, etc.). The second processor of the second device may be further configured to render the state of the first device on the user interface.

According to a second aspect of the present invention, the object is achieved by a method of communicating a presence of a device via a light source configured to emit light comprising an embedded code, the method comprising:

receiving a response signal from a first device, which response signal comprises an identifier of the first device, and which response signal is indicative of that the embedded code has been detected by the first device, and correlating the embedded code with the identifier of the first device, such that the embedded code is representative of the identifier of the first device, wherein the method further comprises:

detecting, by a second device, light emitted by the light source, retrieving, by the second device, the embedded code from the light, retrieving, by the second device, the identifier of the first device correlated with the embedded code and identifying the first device based thereon.

The method may further comprise:

detecting, by the first device, the light emitted by the light source, retrieving, by the first device, the embedded code from the light, identifying, by the first device, the light source based on the embedded code, generating, by the first device, the response signal, and transmitting, by the first device, the response signal.

It should be understood that the method may have similar and/or identical embodiments and advantages as the claimed system.

According to a third aspect of the present invention, the object is achieved by a computer program product for a computing device, the computer program product comprising computer program code to, when the computer program product is run on a processing unit of the computing device, perform the steps of:

receiving a response signal from a first device, which response signal comprises an identifier of the first device, and which response signal is indicative of that the embedded code has been detected by the first device, and correlating an embedded code comprised in light emitted by a light source with the identifier of the first device, such that the embedded code is representative of the identifier of the first device.

It should be understood that the computer program product may have similar and/or identical embodiments and advantages as the claimed system.

BRIEF DESCRIPTION OF THE DRAWINGS

The above, as well as additional objects, features and advantages of the disclosed devices and methods will be better understood through the following illustrative and non-limiting detailed description of embodiments of devices and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
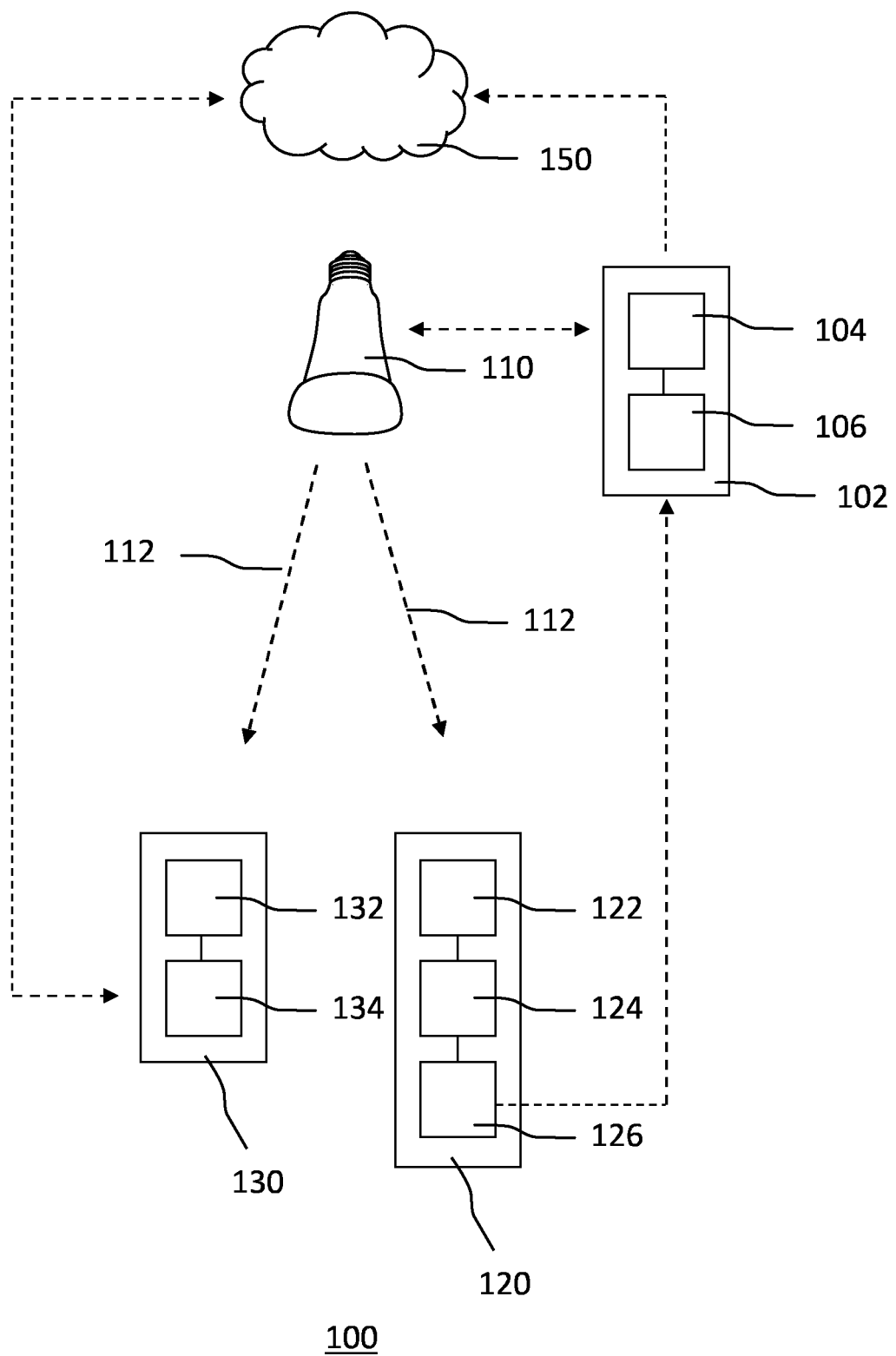
FIG. 1 shows schematically an embodiment of a system for communicating a presence of a device via a light source.

FIG. 1 shows a system 100 for communicating a presence of a device via a light source 110. The light source 110 is configured to emit light 112 comprising an embedded code. The system comprises a controller 102 comprising a receiver 106 configured to receive a response signal from a first device 120, which response signal comprises an identifier of the first device 120, and which response signal is indicative of that embedded code has been detected by the first device 120. The controller 102 further comprises a processor 104 (e.g. a microchip, a microcontroller, circuitry, etc.) configured to correlate the embedded code with the identifier of the first device 120, such that the embedded code is representative of the identifier of the first device 120.

The processor 104 may be configured to correlate the embedded code with the identifier of the first device 120 by embedding the identifier of the first device 120 in the embedded code. The processor 104 may be configured to control the light source 110 directly or be configured to communicate a lighting control command to the light source 110. This enables a second device 130 to retrieve a first device identifier from the embedded code.

The light source 110 may be any type of light source (e.g. an LED or OLED light source) configured to emit light 112 comprising an embedded code. The light source 110 may be configured to provide general lighting, task lighting, ambient lighting, atmosphere lighting, accent lighting, indoor lighting, outdoor lighting, etc. The light source 110 may be installed in a luminaire or in a lighting fixture. The code may be created by any known principle of embedding a code in light, for example by controlling a time-varying, modulated current to the light source to produce variations in the light output, by modulating the amplitude and/or the duty-cycle of the light pulses, etc.

The processor 104 may be configured to correlate the embedded code with the identifier of the first device 120 by storing an association between the identifier of the first device 120 and the embedded code in a memory. The memory may be comprised in the controller 102, or the memory may be comprised in a further device, such as a remote server 150 accessible via a network and/or the internet. The memory may be configured for storing a lookup table comprising associations between first device identifiers and embedded codes. This enables a second device 130, configured to communicate with the memory, to retrieve a first device identifier from the memory after detecting the embedded code.

The system 100 may further comprise the first device 120. The first device 120 may, for example, be a portable device (such as a smartphone, a laptop, a tablet pc, smartglasses, a smart watch, a portable lamp etc.), a stationary device (such as a desktop pc, a coffee machine, a loudspeaker, etc.) or an (autonomous) moving device (e.g. a robotic (cleaning) device). The first device 120 may comprise a first light detector 122 (e.g. a photodiode or a camera) configured to detect the light 112 emitted by the light source 110. The first device 120 may further comprise a first processor 124 configured to retrieve the embedded code from the light 112 and to identify the light source 110 based on the embedded code. The first processor 124 may be further configured to generate the response signal. The first device 120 may further comprise a transmitter 126 configured to transmit the response signal to the controller 102. The transmitter 126 may comprise hardware for transmitting the response signal via any wired or wireless communication protocol, for example Ethernet, USB, Bluetooth, Wi-Fi, Li-Fi, 3G, 4G or ZigBee.

The system 100 may further comprise the second device 130. The second device 130 may for example be a portable device such as a smartphone, smartglasses or a smart watch. The second device 130 may comprise a second light detector 132 (e.g. a photodiode or a camera) configured to detect the light 112 emitted by the light source 110. The light detector 132 may detect the embedded code directly from the light source 112, or it may detect the code in light that is reflected off an object or a surface, for example off the first device 120 or off a user operating the first device 120.

The second device 130 may further comprise a second processor 134 configured to retrieve the embedded code from the light 112. The second processor 134 may be further configured to retrieve the identifier of the first device 120 correlated with the embedded code. In embodiments, wherein the embedded code comprises the identifier of the first device 120, the second processor 134 may retrieve the identifier of the first device 120 directly from the embedded code. Alternatively, in embodiments, wherein an association between the embedded code and the identifier of the first device 120 is stored in a memory, the second processor 134 may retrieve the identifier of the first device 120 from the memory.

The second processor 134 of the second device 130 may be further configured to identify the first device 120 based on the retrieved identifier. The identifier may comprise information about the first device 120. The information may, for example, be representative of a device name, a device type, a device status, a user operating the first device 120, etc.

The second device 130 may further comprise a user interface configured to communicate information of an identified first device 120 to a user operating the second device 120. The user interface may, for example, be a display configured to display the information, a loudspeaker configured emit sound indicative of the information, etc. The second processor 134 may be further configured to render the information of the identified first device 120 on the user interface.

Figure 2:
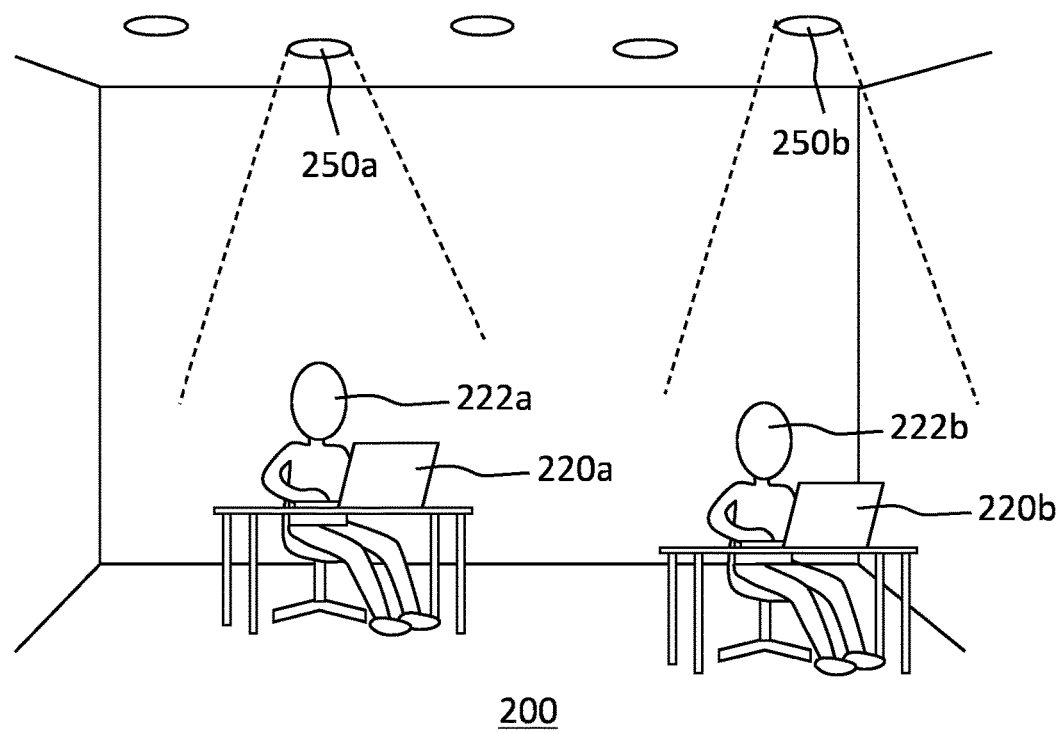
FIG. 2 shows schematically an embodiment of a second device for detecting the presence of a plurality of users of first devices.
Figure 2:
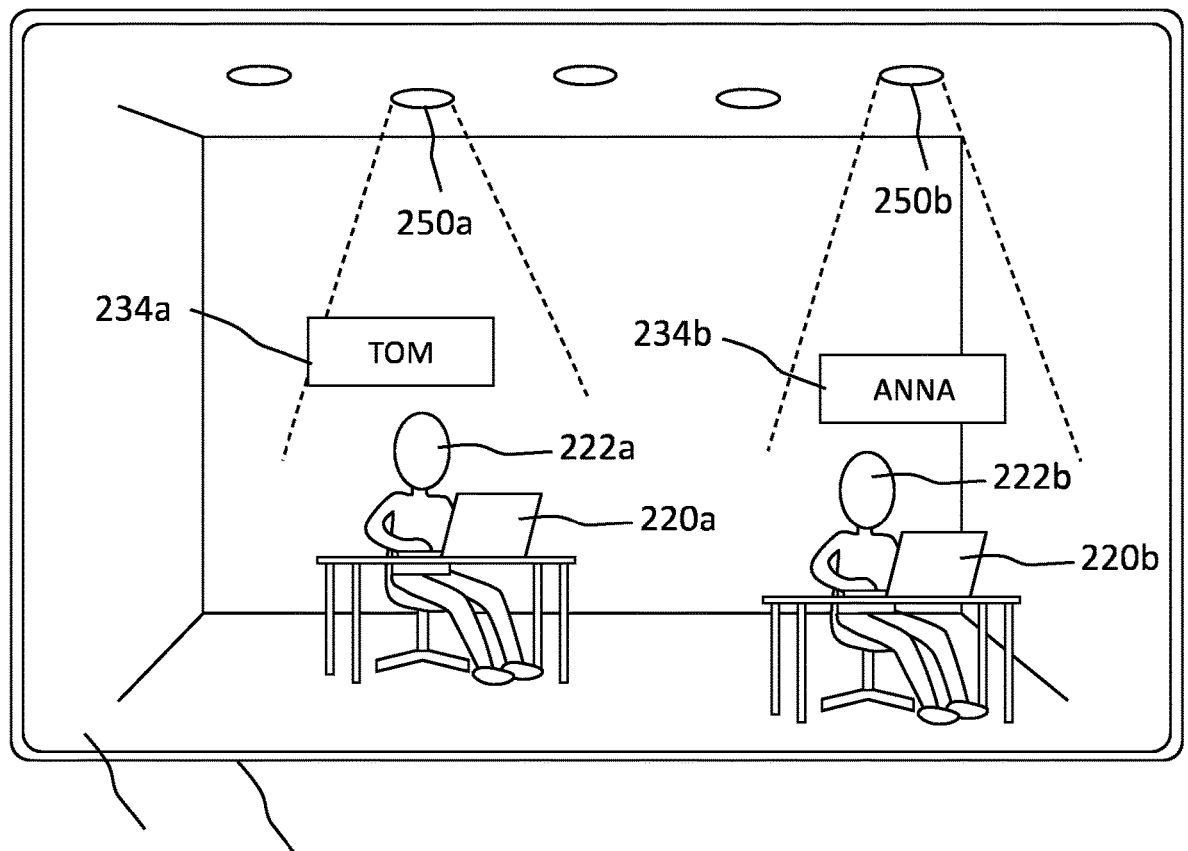

In the example of FIG. 2, a second device 230 may capture an image with a camera of an environment 200. The environment comprises a primary first device 220a and a secondary first device 220b. The light detector of the primary first device 220a may detect light comprising a first embedded code emitted by a first light source 250a, and communicate a response signal to a controller (not shown) to indicate that it has received light emitted by the first light source 250a. The light detector of the secondary first device 220b may detect light comprising a second embedded code emitted by a second light source 250b, and communicate a response signal to the controller to indicate that it has received light emitted by the second light source 250b. The controller may then correlate the first embedded code with a first identifier of the primary first device 220a, and correlate the second embedded code with a second identifier of the secondary first device 220b. The first identifier and the second identifier may comprise information about a first user 222a and a second user 222b, respectively.

The second device 230, in FIG. 2 depicted as a smartphone, may comprise a camera (not shown) configured to detect light comprising the first embedded code emitted by the first light source 250a and light comprising the second embedded code emitted by the second light source 250b. Since the first and second embedded codes are correlated with the first and second identifiers, respectively, a processor (not shown) of the second device 230 is able to retrieve the first and second identifiers based on the first and second embedded codes. The first identifier and the second identifier may comprise names of the first user 222a "TOM" and the second user 222b "ANNA", respectively. The second device 230 further comprises a user interface 232 (a display), and the processor of the second device 230 may retrieve the names from the identifiers, render an image captured of the environment 200 on the display, and render the names TOM and ANNA at a position on the display in proximity of the first user 222a and the second user 222b, respectively. This enables a user of the second device 230 to quickly see which person is located where.

The user interface of the second device 130 may comprises an image rendering device (e.g. a display or a projector), and the second device 130 may further comprise an image capture device (e.g. a camera) configured to capture an image comprising the light source 110.

The second processor 134 may be further configured to analyze the image and determine a position of the light source 110 in the image, and to use the position of the light source 110 as an anchor for rendering the information of the first device 120 on the image rendering device. This enables augmenting the image/environment with augmented reality (AR) content. The second processor 134 may, from a user's perspective, render the information on top of the light source, next to it or above/below it. For instance, in FIG. 2, the processor of the second device 230 may render the names TOM and ANNA below the first light source 250a and the second light source 250b, respectively.

The second processor 134 may be further configured to analyze the image and determine a position of the first device 120 and/or an entity (e.g. a user, a user's desk, furniture, infrastructure, etc.) associated with the first device 120 in the image, and to use the position of the light source 110 as an anchor for rendering the information of the first device 120 on the image rendering device. The second processor 134 may determine which entity is associated by analyzing the image and by determining which entity is in close(st) proximity of the first device 120. The second processor 134 may, from a user's perspective, render the information on top of the first device or the entity, next to it or above/below it. For instance, in FIG. 2, the processor of the second device 230 may render the names TOM and ANNA above the primary first device 220a and the secondary first device 220b, respectively. Alternatively, in FIG. 2, the processor of the second device 230 may render the names TOM and ANNA above the first user 222a and the second user 222b, respectively.

Additionally, the second processor 134 may be configured to analyze the image and determine a second position of a second light source or an object (e.g. room infrastructure, furniture, a user, etc.) in the image, and to use the second position as a second anchor for rendering the information of the first device on the image rendering device. The second processor 134 may, for example, position the information relative to a plurality of light sources, or relative to a plurality of objects (e.g. chairs, desks, cabinets, etc.) located in proximity of the first device 120. The second processor 134 may determine the position/orientation of the second device 130 relative to the plurality of light sources (which each may emit light comprising a unique code). This enables the second processor 134 to map (virtual) three-dimensional information relative to the plurality of light sources. Thus, if a user would move the second device 134 relative to the environment, the orientation and the position of the three-dimensional information might, from a user's perspective, not change relative to the environment.

The identifier may be further representative of a virtual three-dimensional (3D) object. The second processor 130 may be configured to retrieve the virtual 3D object based on the embedded code. The virtual 3D object may, for example, be a virtual 3D sign, a 3D avatar of a user operating the first device 130, a 3D model of the first device 120, etc. The processor 134 may be configured to determine the position of the virtual 3D object by analyzing captured images to identify locations of one or more light sources, first devices, objects and entities. The second processor 134 may then position the virtual 3D object relative to the one or more light sources, first devices, objects and entities.

Figure 3:
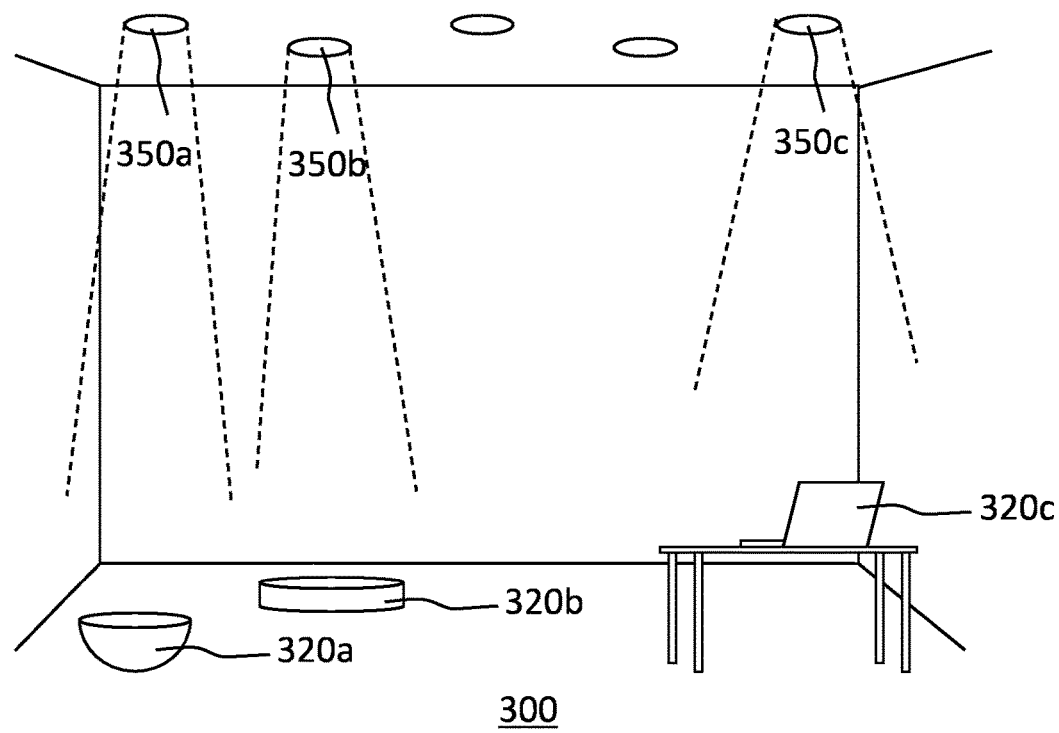
FIG. 3 shows schematically an embodiment of a second device for detecting the presence of a plurality of first devices.
Figure 3:
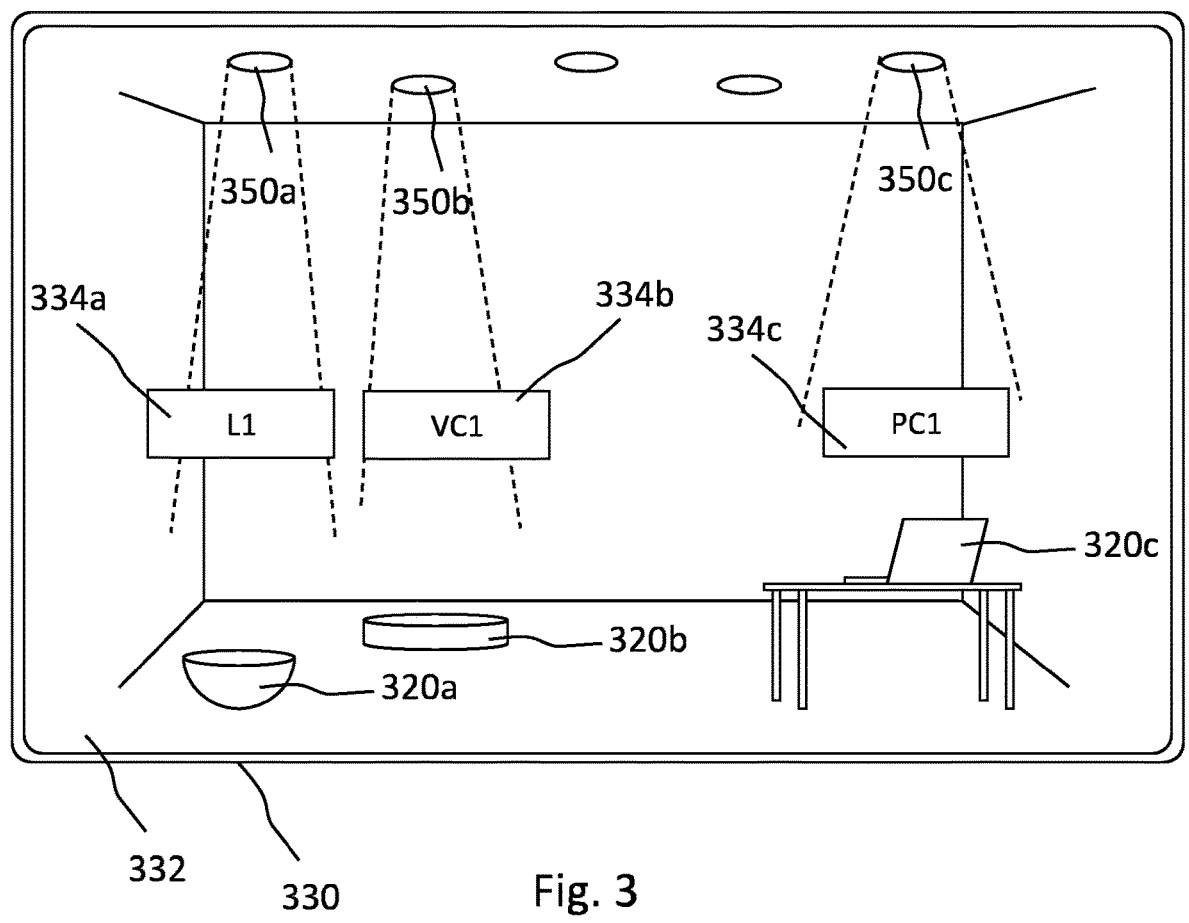

In the example of FIG. 3, a second device 330 may capture an image with a camera of an environment 300. The environment comprises a primary first device 320a (a portable lighting device), a secondary first device 320b (a robotic vacuum cleaner) and a tertiary first device 320c (a laptop pc). The first devices 320a, 320b, 320c may comprise integrated light detectors, or the first devices 320a, 320b, 320c may comprise attachable light detectors. The light detector of the primary first device 320a may detect light comprising a first embedded code emitted by a first light source 350a, and communicate a response signal to a controller (not shown) to indicate that it has received light emitted by the first light source 350a. The light detector of the secondary first device 320b may detect light comprising a second embedded code emitted by a second light source 350b, and communicate a response signal to the controller to indicate that it has received light emitted by the second light source 350b. The light detector of the tertiary first device 320c may detect light comprising a second embedded code emitted by a third light source 350c, and communicate a response signal to the controller to indicate that it has received light emitted by the third light source 350c. The controller may then correlate the first embedded code with a first identifier of the primary first device 320a, correlate the second embedded code with a second identifier of the secondary first device 320b and correlate the third embedded code with a third identifier of the tertiary first device 320c.

The second device 330, in FIG. 3 depicted as a smartphone, may comprise a camera (not shown) configured to detect light comprising the first embedded code emitted by the first light source 350a, light comprising the second embedded code emitted by the second light source 350b and light comprising the third embedded code emitted by the third light source 350c. Since the first, second and third embedded codes are correlated with the first, second and third identifiers, respectively, a processor (not shown) of the second device 330 is able to retrieve the identifiers of the devices based on the embedded codes. The first, second and third identifiers may comprise types/names of the primary first device 320a (L1), the secondary first device 320b (VC1) and the tertiary first device 320c (PC1) respectively. The second device 330 further comprises a user interface 332 (a display), and the processor of the second device 330 may retrieve the types/names from the identifiers, render an image captured of the environment 300 on the display, and render the "L1", "VC1" and "PC1" identifiers at positions on the display relative to the light sources 350a, 350b, 350c or relative to the first devices 320a, 320b, 320c. This enables a user of the second device 330 to quickly see where devices are located in the environment 300.

In the examples of FIGS. 2 and 3, the information is rendered on a display. It should be noted that the display is merely an example of an image rendering device. In embodiments, the image rendering device may be a projector configured to project the information, for example on smartglasses, or directly on the retina of the user, as an overlay on a physical environment wherein the second device 130 is located. The second processor 134 may map the image captured by the image capturing device onto the smartglasses or onto the retina of the user, and the second processor 134 may only render the information as an overlay on the physical environment. The second processor 134 may further determine the position of the information on the smartglasses or the retina of the user relative to the position of the light source 110, the first device 120 or any other object or entity in the physical environment.

The identifier may be further representative of a state of the first device 120 or its user. The second processor 134 of the second device 130 may be further configured to determine the state of the first device 120 based on the identifier. The second processor 134 of the second device 130 may be further configured to render the state of the first device 120 on the user interface. The state of the first device 120 may relate to an on/off state, a certain mode of operation, an application running on the first device 120, a user status of a user operating the first device 120, etc. For instance, in FIG. 3, the identifier of the primary first device 320a (a portable lighting device) may be representative of a current light setting of the portable lighting device, the identifier of the secondary first device 320b (a robotic vacuum cleaner) may be representative of that the vacuum cleaner is currently cleaning, and the identifier of the tertiary first device 320c (a laptop pc) may be representative of that the laptop pc has been set to standby mode. The state of the first devices 320a, 320b, 320c may be rendered on the display 332. This enables a user of the second device 330 to quickly see the states of devices.

Figure 4:
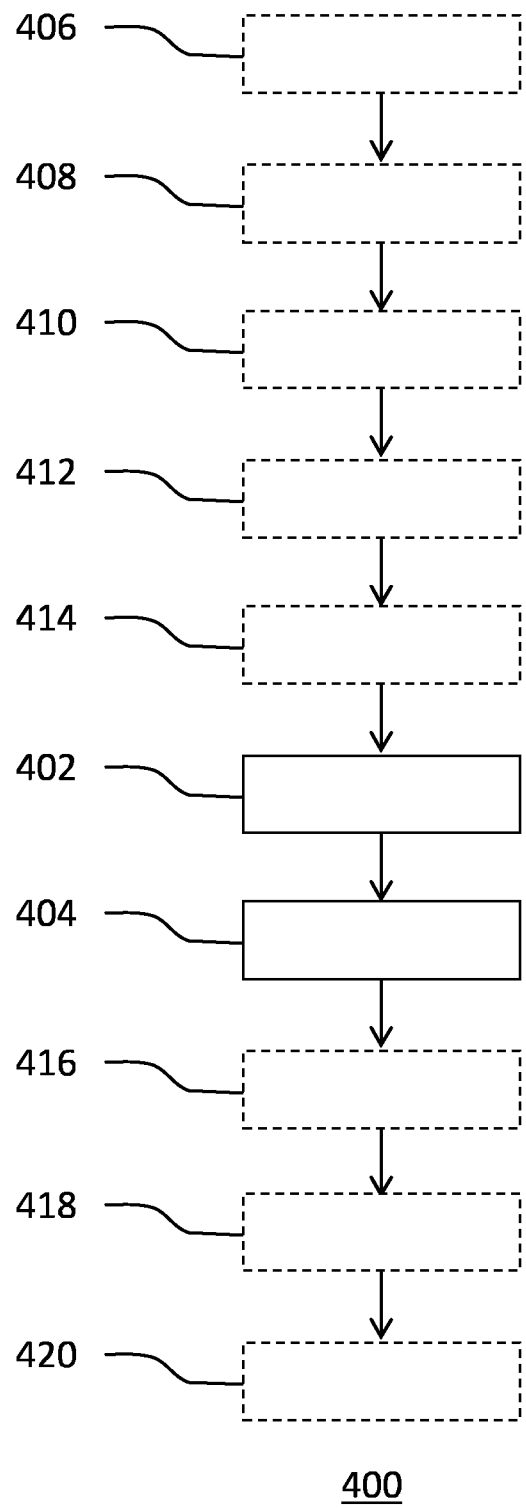
FIG. 4 shows schematically a method of communicating a presence of a device via a light source.

FIG. 4 shows schematically a method 400 of communicating a presence of a device via a light source 110 configured to emit light comprising an embedded code. The method 400 comprises: receiving 402 a response signal from a first device 120, which response signal comprises an identifier of the first device 120, and which response signal is indicative of that the embedded code has been detected by the first device 120, and correlating 404 the embedded code with the identifier of the first device 120, such that the embedded code is representative of the identifier of the first device 120. The method 400 may be executed by computer program code of a computer program product when the computer program product is run on a processing unit of a computing device, such as the processor 104 of the controller 100.

The method 400 may further comprise: detecting 406 the light emitted by the light source 110, retrieving 408 the embedded code from the light, identifying 410 the light source 110 based on the embedded code, generating 412 the response signal, and transmitting 414 the response signal. These steps may be performed by the first device 120. The steps 406-414 of the method 400 may be executed by computer program code of a computer program product when the computer program product is run on a processing unit of a computing device, such as the first processor 124 of the first device 120.

The method 400 may further comprise: detecting 416 light emitted by the light source, retrieving 418 the embedded code from the light, retrieving 420 the identifier of the first device 120 correlated with the embedded code and identifying the first device 120 based thereon. These steps may be performed by the second device 130. The steps 416-420 of the method 400 may be executed by computer program code of a computer program product when the computer program product is run on a processing unit of a computing device, such as the second processor 134 of the second device 130.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware. The mere fact that certain measures are recited in mutually different dependent claims does not indicate that a combination of these measures cannot be used to advantage.

Aspects of the invention may be implemented in a computer program product, which may be a collection of computer program instructions stored on a computer readable storage device which may be executed by a computer. The instructions of the present invention may be in any interpretable or executable code mechanism, including but not limited to scripts, interpretable programs, dynamic link libraries (DLLs) or Java classes. The instructions can be provided as complete executable programs, partial executable programs, as modifications to existing programs (e.g. updates) or extensions for existing programs (e.g. plugins). Moreover, parts of the processing of the present invention may be distributed over multiple computers or processors.

Storage media suitable for storing computer program instructions include all forms of nonvolatile memory, including but not limited to EPROM, EEPROM and flash memory devices, magnetic disks such as the internal and external hard disk drives, removable disks and CD-ROM disks. The computer program product may be distributed on such a storage medium, or may be offered for download through HTTP, FTP, email or through a server connected to a network such as the Internet.

The invention claimed is:

1. A system for communicating a presence of a device via a light source configured to emit light comprising an embedded code, the system comprising:
   a controller comprising:
      a receiver configured to receive a response signal from a first device which response signal comprises an identifier of the first device, and which response signal is indicative of that the embedded code has been detected by the first device, and
      a processor configured to correlate the embedded code with the identifier of the first device by associating the identifier of the first device with the embedded code, such that the embedded code is representative of the identifier of the first device, wherein the system further comprises a second device comprising:
      a second light detector configured to detect light emitted by the light source,
      a second processor configured to retrieve the embedded code from the light, to retrieve the identifier of the first device correlated with the embedded code, and to identify the first device based thereon.

2. The system of claim 1, wherein the processor is configured to correlate the embedded code with the identifier of the first device by embedding the identifier of the first device in the embedded code.

3. The system of claim 1, wherein the processor is configured to correlate the embedded code with the identifier of the first device by storing an association between the identifier of the first device and the embedded code in a memory.

4. The system of claim 1, further comprising:
the first device comprising:
  a first light detector configured to detect the light emitted by the light source,
  a first processor configured to retrieve the embedded code from the light, to identify the light source based on the embedded code, and to generate the response signal, and
  a transmitter configured to transmit the response signal to the controller.

5. The system of claim 1, wherein the second device further comprises a user interface, and wherein the second processor is further configured to render information of the identified first device on the user interface.

6. The system of claim 5, wherein the user interface comprises an image rendering device, and
  wherein the second device further comprises an image capture device configured to capture an image comprising the light source,
  and wherein the second processor is further configured to determine a first position of the light source in the image, and to use the first position as an anchor for rendering the information of the first device on the image rendering device.

7. The system of claim 6, wherein the second processor is further configured to determine a second position of a second light source or an object in the image, and to use the second position as a second anchor for rendering the information of the first device on the image rendering device.

8. The system of claim 5, wherein the user interface comprises an image rendering device, and
  wherein the second device further comprises an image capture device configured to capture an image comprising the first device and/or an entity associated with the first device, and
  wherein the second processor is further configured to determine a first position of the first device and/or the entity in the image, and to use the first position as an anchor for rendering the information of the first device on the image rendering device.

9. The system of claim 1, wherein the identifier is representative of a user identifier of a user operating the first device, and wherein the second processor is configured to identify the user operating the first device based on the user identifier.

10. The system of claim 1, wherein the identifier is further representative of a state of the first or its user, and wherein the second processor is further configured to determine the state of the first device based on the identifier.

11. A method of communicating a presence of a device via a light source configured to emit light comprising an embedded code, the method comprising:
  receiving a response signal from a first device, which response signal comprises an identifier of the first device, and which response signal is indicative of that the embedded code has been detected by the first device, and
  correlating the embedded code with the identifier of the first device, such that the embedded code is representative of the identifier of the first device wherein the method further comprises:
  detecting, by a second device, light emitted by the light source,
  retrieving, by the second device, the embedded code from the light,
  retrieving, by the second device, the identifier of the first device correlated with the embedded code and identifying the first device based thereon.

12. The method of claim 11, further comprising:
  detecting, by the first device, the light emitted by the light source,
  retrieving, by the first device the embedded code from the light,
  identifying, by the first device, the light source based on the embedded code,
  generating, by the first device, the response signal, and
  transmitting, by the first device, the response signal.

* * * * *